(12) United States Patent
Baki et al.

(10) Patent No.: US 9,821,346 B1
(45) Date of Patent: Nov. 21, 2017

(54) PLANAR GEARING SYSTEM

(71) Applicant: International Business Machines Corporation, Armonk, NY (US)

(72) Inventors: Abdul Baki, Southampton (GB); Colin I. Holyoake, Braishfield (GB); Matthew J. Kockott, Hursley (GB); John A. Owen, Eastleigh (GB); Joanne E. Woods, Alderhot (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/152,972

(22) Filed: May 12, 2016

(51) Int. Cl.
*B08B 1/00* (2006.01)
*F16H 1/00* (2006.01)
*F16H 1/06* (2006.01)

(52) U.S. Cl.
CPC ............... *B08B 1/006* (2013.01); *F16H 1/06* (2013.01)

(58) Field of Classification Search
CPC .................................. B08B 1/006; F16H 1/06
USPC .......................................... 396/427; 348/143
See application file for complete search history.

(56) References Cited

U.S. PATENT DOCUMENTS

| | | | |
|---|---|---|---|
| 4,588,305 A | 5/1986 | Piguet et al. | |
| 4,748,603 A | 5/1988 | Ray et al. | |
| 4,929,072 A | 5/1990 | Fujie et al. | |
| 6,461,265 B1 | 10/2002 | Graham et al. | |
| 6,669,594 B2 | 12/2003 | Kerr | |
| 8,333,127 B2 | 12/2012 | Singh et al. | |
| 9,127,752 B2 | 9/2015 | Kullin | |
| 2013/0104933 A1* | 5/2013 | Aldred | G02B 27/0006 134/6 |
| 2015/0274287 A1 | 10/2015 | Robertson et al. | |

FOREIGN PATENT DOCUMENTS

| | | |
|---|---|---|
| CA | 2435971 A1 | 1/2004 |
| CN | 202764706 U | 3/2013 |
| WO | 2014/149969 A1 | 9/2014 |

OTHER PUBLICATIONS

Chocholek, S.E., "The development of a differential for the improvement of traction control", zhome, Torsen Differential white paper, C368/88, © IMechE 1988, 7 pages, <http://www.zhome.com/ZCMnL/tech/Torsen/Torsen.htm>.

(Continued)

*Primary Examiner* — Rochelle-Ann J Blackman
(74) *Attorney, Agent, or Firm* — Brian M. Restauro

(57) ABSTRACT

Embodiments of the present invention provide a camera cleaning apparatus. According to one embodiment, a first disc coupled to a first rod, a camera mounted to a portion of the first disc; a second disc coupled to a second rod, wherein a first portion of the first rod is situated inside the second rod and the first rod rotates independently of the second rod; a first and a second directional sensor operatively coupled to the first disc; a first motor mechanically connected to a first rod; a protective cover mounted between the first and the second disc; and a cleaning mechanism mechanically coupled to the second disc and an attachment point disposed on a portion of the protective cover is provided. Embodiments of the present invention can be utilized to clean a protective cover that encapsulates the camera without obscuring the camera's field of view.

19 Claims, 4 Drawing Sheets

(56) References Cited

OTHER PUBLICATIONS

Soong et al., "Flow structure between two co-axial disks rotating independently", Science Direct, Experimental Thermal and Fluid Science, vol. 27, Issue 3, Mar. 2003, pp. 295-311, Copyright © 2003 Elsevier Science Inc.
Vazelothir, "Recommend a central heating timer/programmer/control unit?", Ask About Money, Discussion in Home Energy, Oct. 7, 2009, 2 pages, <http://www.askaboutmoney.com/threads/recommend-a-central-heating-timer-programmer-control-unit.123540/>.
"Dotworkz DomeWizard Dome Cleaning System for HD Relay eLiveStream HD Cameras" YouTube Apr. 4, 2011 <https://www.youtube.com/watch?v=J8PUblmf4Ak>.
"DomeWizard™ Dome Cleaning Tool", Dotworkz, Feb. 21, 2015, Internet Archive Wayback Machine. <http://web.archive.org/web/20150221213800/http://www.dotworkz.com/domewizard>.
"2013 Nissan Altima—Rear-Camera Innovation—Tri-State Nissan—Winchester Virginia" YouTube Oct. 25, 2012. <https://youtu.be/9ivVqNDwuno>.
"King Dome", Jan. 29, 2016, Internet Archive Wayback Machine. <http://web.archive.org/web/20160129142911/http://www.martin.com/en-us/product-details?ProductID=PROD117>.

\* cited by examiner

○ = NO CONTACT
● = CONTACT MADE

US 9,821,346 B1

PLANAR GEARING SYSTEM

BACKGROUND

The present invention relates generally to the field of planar gearing systems, and more particularly to independent movement of discs in planar gearing systems.

A planar gearing system is one which two or more concentric discs control the movement of apparatus attached to each disc (i.e., plane). Each disc is controlled separately. For example, the outer disc can move independently from the inner. Each disc can contain one or more objects. For example, a disc can contain a lightbulb (e.g., a disco light) which revolves in one direction while another disc can contain colored transparencies that affect the color of the light emitted, which can rotate in the opposite direction.

Security cameras can use gearing systems to traverse over a greater angular range, thereby permitting a wider field of view. Protective coverings can be added to protect the security camera and its lens. Cleaning the protective covering can be an issue.

SUMMARY

According to one aspect of the present invention, there is provided a camera cleaning apparatus comprising: a first disc coupled to a first rod; a camera mounted to a portion of the first disc; a second disc coupled to a second rod, wherein a first portion of the first rod is situated inside the second rod and the first rod rotates independently of the second rod, wherein the first and the second disc are mounted on an axis of rotation for independent rotation; a first and a second directional sensor operatively coupled to the first disc, wherein the first directional sensor operates to engage a locking mechanism to rotate the first and the second discs in a synchronous direction, and the second directional sensor operates to disengage the locking mechanism; a first motor mechanically connected to a first rod, such that the first motor is capable of rotating the first rod; a protective cover mounted between the first and the second disc; and a cleaning mechanism mechanically coupled to the second disc and an attachment point disposed on a portion of the protective cover.

According to another aspect of the present invention there is provided a camera cleaning apparatus comprising: a first disc coupled to a first rod; a camera mounted to a portion of the first disc; a first motor mechanically connected to a first rod, such that the first motor is capable of rotating the first rod; a second disc coupled to a second rod, wherein a first portion of the first rod is situated inside the second rod and the first rod rotates independently of the second rod, wherein the first and the second disc are mounted on an axis of rotation for independent rotation; a second motor mechanically connected to the second rod such that the second rod is capable of rotating the second disc, wherein the second motor is mechanically connected to the second rod via a third shaft coupled to one or more interlocking gears that are coupled to the second shaft; a first and a second directional sensor operatively coupled to the first disc, wherein the first directional sensor operates to engage a locking mechanism to rotate the first and the second discs in a synchronous direction, the second directional sensor operates to disengage the locking mechanism, and the first and second disc are coaxially mounted on the axis of rotation; a protective cover mounted between the first and the second disc, wherein the protective cover is a transparent dome; and a cleaning mechanism mechanically coupled to the second disc and an attachment point disposed on a portion of the protective cover, wherein the cleaning mechanism is a wiper blade.

According to yet another aspect of the present invention, there is provided a camera cleaning apparatus comprising: a first disc coupled to a first rod, a camera mounted to a portion of the first disc; a first motor mechanically connected to a first rod, such that the first motor is capable of rotating the first rod; a second disc coupled to a second rod, wherein a first portion of the first rod is situated inside the second rod and the first rod rotates independently of the second rod, wherein the first and the second disc are mounted on an axis of rotation for independent rotation; a second motor mechanically connected to the second rod such that the second rod is capable of rotating the second disc, wherein the second motor is mechanically connected to the second rod via a third shaft coupled to one or more interlocking gears that are coupled to the second shaft; a first and a second directional sensor operatively coupled to the first disc, and a third and fourth directional sensor operatively coupled to the second disc, wherein the first and the fourth directional sensor engage to trigger a locking mechanism to rotate the first and the second discs in a synchronous direction, and first and the fourth directional sensor interact to cause completion of an electric circuit that shuts off power to the second motor, the second and third directional sensor interact to disengage the locking mechanism that allows the first and the second disc to turn independently of one another, the second and third directional sensor interact to cause a disruption of the electric circuit that, when completed, shuts off power to the second motor, wherein, the first and the second disc rotate in parallel planes, and the first and second disc are coaxially mounted on the axis of rotation; a protective cover mounted between the first and the second disc, wherein the protective cover is a transparent dome; and a cleaning mechanism mechanically coupled to the second disc and an attachment point disposed on a portion of the protective cover, wherein, the protective cover is a transparent dome, and wherein the cleaning mechanism is a wiper blade.

DETAILED DESCRIPTION

Embodiments of the present invention recognize the need for security cameras to have unobstructed fields of view. In some instances, security cameras may have a protective dome mounted over the camera to protect the camera lens. Embodiments of the present invention recognize that the protective dome mounted over the camera can become dirty. In some instances, a cleaning mechanism used to clear dirt from the protective dome could obscure the camera's field of view when cleaning the protective dome while the camera is operating. As such, embodiments of the present invention provide solutions for cleaning protective camera encasings without obstructing the camera's field of view. In this manner, as described in greater detail later in this specification, embodiments of the present invention use a planar gearing system having an inner and outer disc to allow each disc to move independently, wherein the inner disc includes a mounted camera and the outer disc has, affixed to it, a cleaning mechanism (e.g., a wiper blade). Locking mechanisms at specified points on each respective disc prevent overlapping thereby inhibiting the cleaning mechanism from obscuring the camera's field of view.

Figure 1:
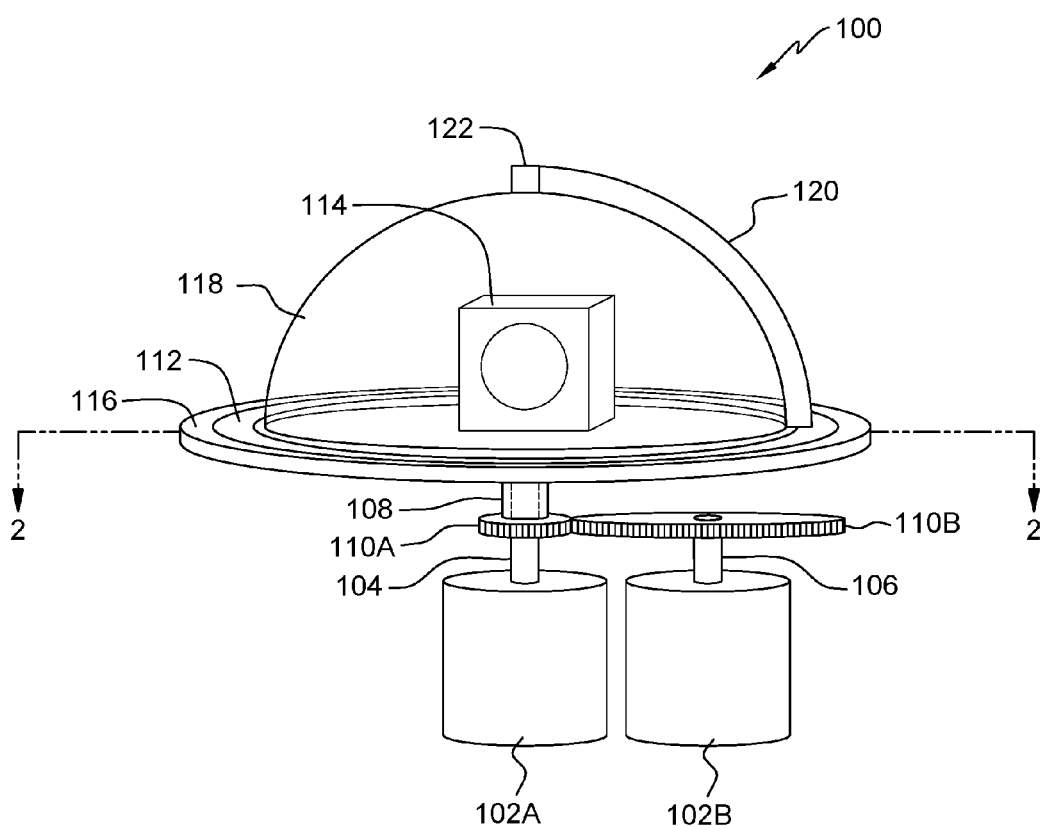
FIG. 1 is a perspective view of a planar gearing system, in accordance with an embodiment of the present invention.

FIG. 1 is a perspective view of planar gearing system 100, in accordance with an embodiment of the present invention. Planar gearing system 100 includes inner disc 112 and outer disc 116. Both inner disc 112 and outer disc 116 are coaxially mounted on an axis of rotation for independent rotation in parallel planes.

Inner disc 112 has a top portion and a bottom portion opposite the top portion along a horizontal plane. In this embodiment, camera 114 is mounted to the center of the top portion inner disc 112. In other embodiments, camera 114 can be mounted slightly off-center.

Inner disc 112 has sides (not labeled) formed by the top and the bottom portion. The sides of inner disc 112 have protruding elements (as shown and described in FIGS. 3A-3C) that interlock with a locking mechanism (e.g., solenoid 115, as shown and described in FIGS. 3A-3C) to prevent independent rotation of outer disc 116. In this embodiment, the protruding elements can be rounded. In other embodiments, the protruding elements can be peak elements. In yet other embodiments, the protruding elements can be chamfered elements.

Coupled to the bottom portion of inner disc 112 is shaft 104 (e.g., a first rod), where shaft 104 rotates inner disc 112. Shaft 104 has two ends. One end of shaft 104 is coupled to the bottom portion of inner disc 112. The other end of shaft 104 is coupled to motor 102A. Motor 102A provides a rotational force that is transferred to shaft 104. In general, motor 102A can be implemented with any electrical machine that can be used to generate a rotation force to turn shaft 104 in a clockwise or counterclockwise motion. Together, shaft 104 and motor 102A allow inner disc 112 to turn independently of outer disc 116.

Coupled between the inner and outer discs is protective cover 118. Protective cover 118 functions to shield camera 114 from debris that could obstruct the view of camera 114. In this embodiment, protective cover 118 is composed of a transparent material, such that the transparent material does not obstruct the view of camera 114. In other embodiments, protective covering 118 can be made of any material allowing camera 114 to record discernable images. In this embodiment, protective cover 118 is a dome. In other embodiments, protective cover 118 can be made to any shape necessary to enclose and protect camera 114.

Attachment point 122 is disposed on top of protective cover 118. Attachment point 122 serves as a pivoting point for cleaning mechanism 120. In this embodiment, attachment point 122 is a bolt and bearing, to which, one end of cleaning mechanism 120 is attached. The other end of cleaning mechanism 120 is coupled to a top portion of outer disc 116. Cleaning mechanism 120, when rotated, can span the entire length of protective cover 118 and serves to clean protective cover 118. For example, where protective cover 118 is dome-shaped, cleaning mechanism 120 spans the radius of the protective cover 118. In this embodiment, cleaning mechanism 120 is a wiper blade. In other embodiments, cleaning mechanism 120 can be any cleaning mechanism that can be coupled to attachment point 122 and outer disc 116. For example, in other embodiments, cleaning mechanism 120 can be a combination of a wiper blade and a mechanism to dispense cleaning solution onto protective cover 118.

Outer disc 116 has a top portion and a bottom portion. As mentioned earlier, cleaning mechanism 120 is attached to the top of protective cover 118. Coupled to the bottom portion of outer disc 116 is shaft 108 (e.g., a second rod), where shaft 108 has two ends. A first end of shaft 108 is coupled to the bottom portion of outer disc 116. A second end of shaft 108 is coupled to gear 110A. In this embodiment, shaft 108 encompasses a portion of shaft 104, where shaft 104 runs through shaft 108 on a vertical axis.

Gear 110A and gear 110B interlock to produce rotational motion to shaft 104. Gear 110B has a top and bottom portion. The bottom portion of gear 110B is coupled to shaft 106 (e.g., a third rod). Shaft 106 has a top and bottom end. The top portion of shaft 106 is coupled to the bottom portion of gear 110B. The bottom end of shaft 106 is coupled to motor 102B. Motor 102B generates a rotational force that is transferred to gear 110B via shaft 106. In general, motor 102B can be implemented with any electrical machine that generates a rotational force. Together, shaft 106, gears 110B and 110A, shaft 108, and motor 102B allow outer disc 116 to turn independently of inner disc 112.

In this embodiment, inner disc 112 and outer disc 116 rotate at different speeds via respective motors 102A and 102B. In other embodiments, inner disc 112 and outer disc 116 can rotate at the same speed.

In one embodiment, inner disc 112 and outer disc 116 each have respective sensors (shown in FIGS. 3A, 3B, and 3C) that, when in contact, operate to enable a switch in rotational direction of outer disc 116. For example, when a pair of sensors of inner disc 112 and outer disc 116 come into contact, a locking mechanism is triggered which couples outer disc 116 to inner disc 112, as discussed in greater detail with regard to FIGS. 3A, 3B, and 3C.

When the pair of sensors of inner disc 112 and outer disc 116 come into contact, an electrical circuit (not shown) is completed which shuts off motor 102B. In this manner, because outer disc 116 is coupled to inner disc 112 and because motor 102B is no longer generating rotational force, outer disc 116 can then be rotated by the rotational motion generated by motor 102A via shaft 104. Accordingly, cleaning mechanism 120 (which is attached to outer disc 116) also switches direction which allows cleaning mechanism 120 to continue cleaning protective cover 118 without obstructing the view of camera 114.

Figure 2:
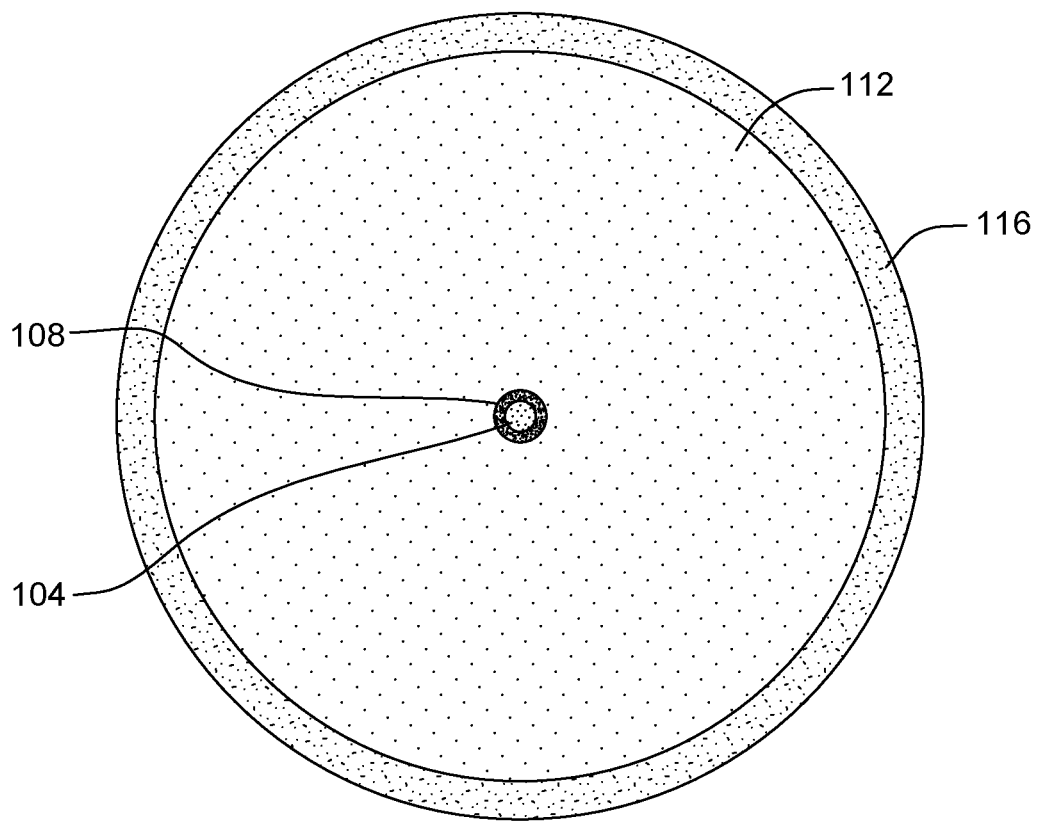
FIG. 2 is a cross section view of the inner and outer discs of the planar gearing system, in accordance with an embodiment of the present invention.

FIG. 2 is a cross section view of the inner and outer discs of planar gearing system 100, in accordance with an embodiment of the present invention.

Specifically, FIG. 2 shows a cross section view along section line 2 of inner disc 112 and outer disc 116, as shown in FIG. 1. Disposed in the center portion of inner disc 112 is shaft 104 which is connected to motor 102A (not shown). As previously mentioned, motor 102A generates a rotational motion that is transferred to inner disc 112 via shaft 104 which causes inner disc 112 to have a rotational motion (e.g., clockwise or counter clockwise).

Disposed in the center portion of outer disc 116 is shaft 108 which is connected to gear 110A (not shown). Motor 102B (not shown) generates a torque that is transferred to gear 110B via shaft 106 which causes gear 110B to have rotational motion. Gears 110A and 110B interlock to transfer rotational motion to shaft 108 which, in turn causes outer disc 116 to rotate independently of inner disc 112.

Figure 3A:
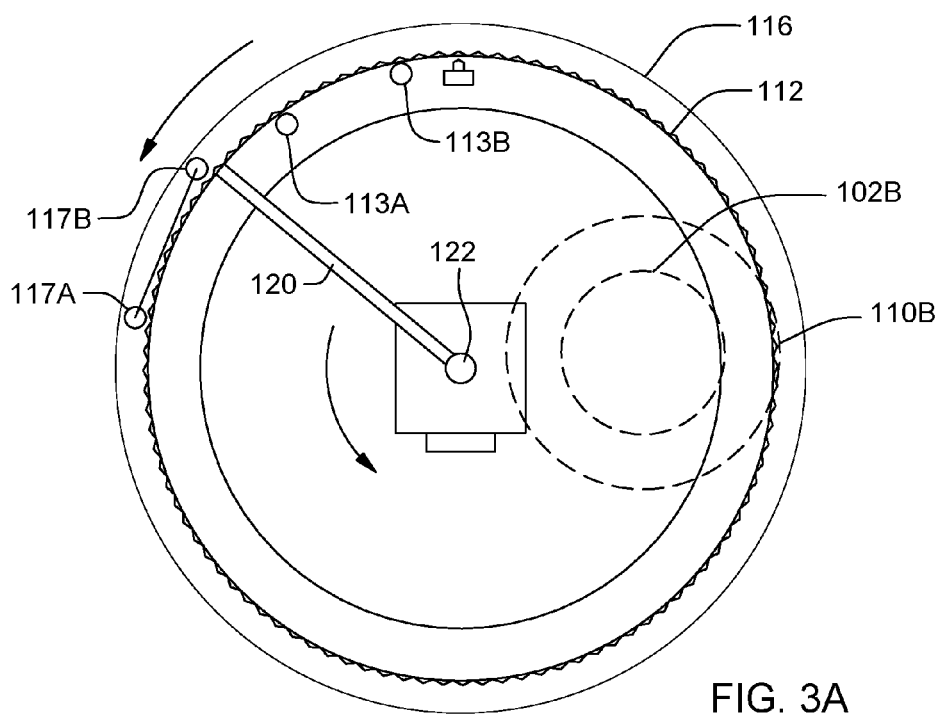
FIGS. 3A, 3B, and 3C are cross section views depicting a locking mechanism of the planar gearing system which is helpful in understanding a cleaning cycle, in accordance with an embodiment of the present invention.
Figure 3B:
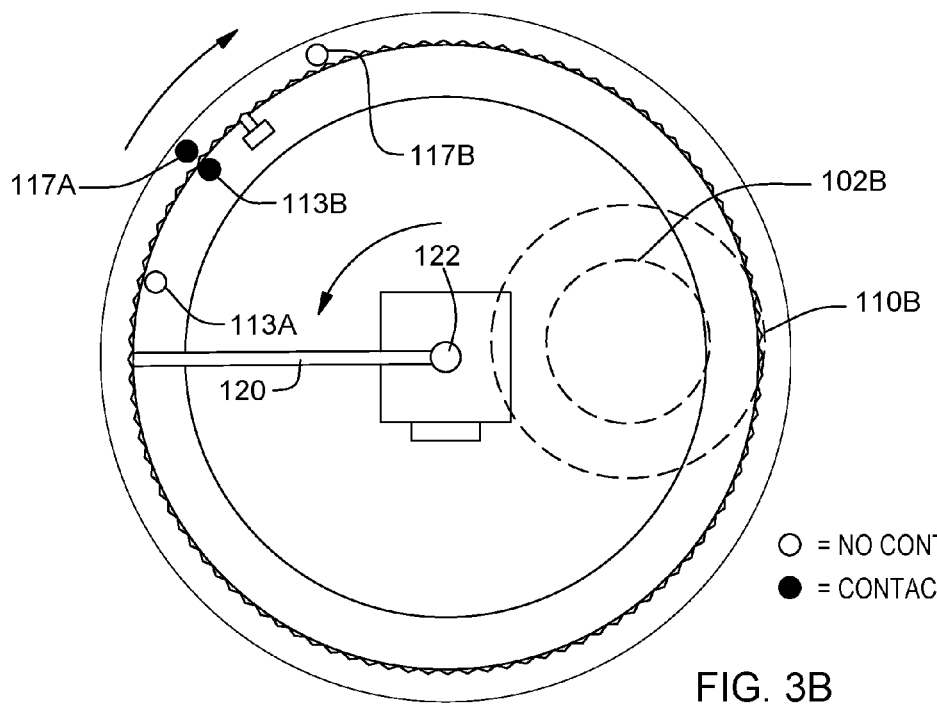
Figure 3C:
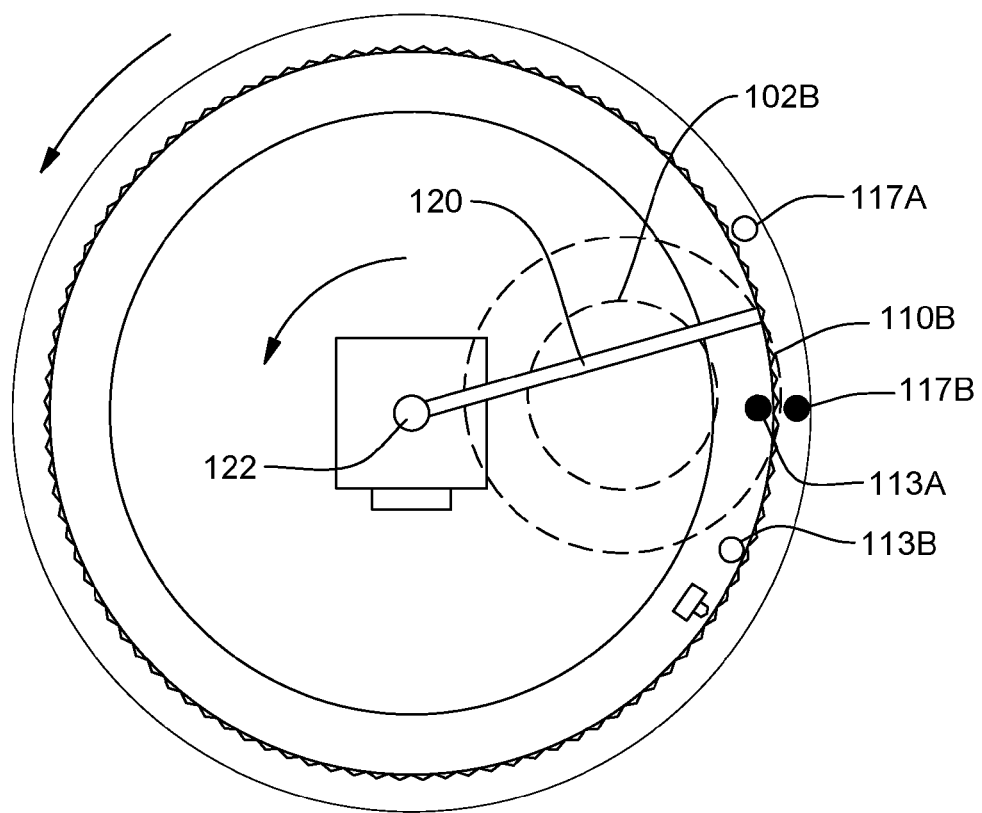

FIGS. 3A, 3B, and 3C are cross section views depicting a locking mechanism of the planar gearing system which is helpful in understanding a cleaning cycle, in accordance with an embodiment of the present invention.

A cleaning cycle, as used herein, refers to a cycle wherein the locking mechanisms of planar gearing system 100 engage and disengage. In the following example Figures below, the discs (e.g., inner disc 112 and outer disc 116) are rotating counter clockwise (e.g., FIG. 3A) with an unengaged locking mechanism. In FIG. 3B, the locking mechanism is shown and described as being engaged while FIG. 3C shows and describes the locking mechanism disengaging. Throughout the entire example, the cleaning mechanism (e.g., cleaning mechanism 120) never obscures the view of the camera (e.g., camera 114) because the locking mechanism engages just before the cleaning mechanism obscures the camera's field of view. As described below, the engaged locking mechanism reverses the rotational direction of the outer disc, opposite of the directional rotation of the inner disc (i.e., the disc having the camera mounted on it) thus preventing the cleaning mechanism from obscuring the camera's field of view. When the locking mechanism disengages, the rotational direction of the outer disc is again reversed to the opposite rotational direction of the inner disc.

In this embodiment, the locking mechanism engages when a first sensor coupled to inner disc 112 and a respective first sensor coupled to outer disc 116 come into contact. In another embodiment, locking mechanisms engage when a first sensor coupled to outer disc 116 triggers a respective first sensor coupled to inner disc 112.

In this embodiment, the locking mechanism is solenoid 115 that interacts with the protruding elements of inner disc 112 so as to lock inner disc 112 and outer disc 116. In this embodiment, solenoid 115 fires a pin that interacts with protruding elements of outer disc 116. The locking mechanism effectively couples outer disc 116 to inner disc 112 so that outer disc 116 can no longer freely rotate on its own. In other embodiments, the locking mechanism can be achieved via a magnetic coupling of outer disc 116 to inner disc 112.

The locking mechanisms disengages when a second sensor coupled to inner disc 112 and a corresponding second sensor coupled to outer disc 116 come into contact. In this embodiment, the locking mechanism (e.g., solenoid 115) retracts the pin that latches on to the protruding elements of inner disc 112.

FIG. 3A is a cross section view depicting the locking mechanism of planar gearing system 100 in an unengaged position during a cleaning cycle, in accordance with an embodiment of the present invention.

In this example, both inner disc 112 and outer disc 116 are rotating in a counter clockwise directional motion. Sensors 117A and 117B are coupled along outer disc 116 while sensors 113A and 113B are coupled along inner disc 112. In this example, sensors 113A and 117B serve as the first pair of sensors while sensors 113B and 117A serve as the second pair of sensors. In this example, sensors 113A and 117B have not interacted and are otherwise not engaged. Accordingly, the locking mechanism is likewise in a disengaged state.

In this example, the locking mechanism comprises solenoid 115 that interacts with protruding elements of inner disc 112. For example, when the locking mechanism is engaged, solenoid 115 interacts with the protruding elements such that outer disc 116 cannot turn independently of inner disc 112. As shown, solenoid 115 is placed on inner disc 112 and the pin in which solenoid 115 fires, is in a retracted position, that is, solenoid 115 is not engaged.

An electrical circuit is then activated when the locking mechanism (e.g., solenoid 115) interacts with inner disc 112 that shuts off motor 102B. In this embodiment, the electrical circuit is completed when the locking mechanism interacts with inner disc 112. The electrical circuit, when completed, shuts off motor 102B which in turn stops the rotational force previously provided by motor 102B. Accordingly, the subsequent rotational motion generated by motor 102B no longer controls the direction in which outer disc 116 rotates. Because outer disc 116 is effectively bound to inner disc 112, outer disc 116 can continue to rotate by virtue of the rotational force and rotational motion exerted on outer disc 116 by inner disc 112. The movement of inner disc 112 combined with the lack of rotational force exerted by motor 102B effectively operates to change rotational motion of outer disc 116 (e.g., clockwise rotational motion when motor 102B is exerting rotational force and counter-clockwise rotational motion when motor 102 is not exerting rotational force).

Cleaning mechanism 120 is shown as being behind camera 114 and rotating counter clockwise with outer disc 116 and faces the 10 o'clock position. In this embodiment, cleaning mechanism 120 rotates in the same direction as outer disc 116. The first pair of sensors engage (e.g., sensors 113B and 117A) before cleaning mechanism 120 obscures the camera's (e.g., camera 114) field of view. Accordingly, responsive to the first pair of sensors engaging, the locking mechanism is triggered which switches the directional rotation of the outer disc and cleaning mechanism 120, as discussed in greater detail with regard to FIG. 3B.

FIG. 3B is a cross section view depicting the locking mechanism of planar gearing system 100 in an engaged position during a cleaning cycle, in accordance with an embodiment of the present invention.

In this example, inner disc 112 and outer disc 116 have rotated counter clockwise. As shown, cleaning mechanism 120 appears to have shifted from the 10 o'clock position (as shown and described in FIG. 3A) to the 9 o'clock position. Sensors 113B and 117A have come into contact (due to the independent rotational motion exerted on respective inner disc 112 and outer disc 116). The locking mechanism (e.g., solenoid 115) has fired a pin that interacts with the protruding elements of outer disc 116 (e.g., the engaged position) which couples outer disc 116 to inner disc 112.

In this example, sensors 113B and 117A have interacted causing the locking mechanism to switch to the "engaged" position and completing the electrical circuit that shuts off power to motor 102B. Accordingly, because outer disc 116 has be coupled to inner disc 112 and power that once supplied the force to provide rotational motion to outer disc 116 has been shut off, outer disc 116 making it appear to change rotational direction from the perspective of the still moving inner disc 112.

FIG. 3C is a cross section view depicting the locking mechanism of planar gearing system 100 after disengaging during a cleaning cycle, in accordance with an embodiment of the present invention.

In this example, inner disc 112 and outer disc 116 have rotated clockwise. As shown, cleaning mechanism 120 appears to have shifted from the 9 o'clock position to the just between the 2 and 3 o'clock position. Sensors 113A and 117B have come into contact. The locking mechanism (e.g., solenoid 115) has been disengaged. As shown, solenoid 115 has retracted the pin that couples outer disc 116 to inner disc 112.

In this example, responsive to the locking mechanism disengaging (via the interaction of sensors 113A and 117B) the completed circuit that shuts off power to motor 102B is disrupted. Motor 102B can now produce a rotational force that is transferred to gear 110B via shaft 106. Gears 110B and 110A can then interlock to transmit rotational motion via shaft 108 to outer disc 116, as shown and previously described in FIG. 1. Effectively, the interaction between sensors 113B and 117A, disengages the locking mechanism that coupled outer disc 116 to inner disc 112. Accordingly, outer disc 116 can now switch rotational direction from the clockwise rotational direction depicted in FIG. 3B to the counter clockwise rotational direction in FIG. 3C. The outer disc 116 and cleaning mechanism 120 can then reverse rotational direction before obscuring the camera's (e.g., camera 114) field of view.

The terminology used herein is for the purpose of describing particular embodiments only and is not intended to be limiting to the invention. As used herein, the singular forms "a", "an" and "the" are intended to include the plural forms as well, unless the context clearly indicates otherwise.

Having described preferred embodiments of a planar gearing system (which are intended to be illustrative and not limiting), it is noted that modifications and variations may be made by persons skilled in the art in light of the above teachings. It is therefore to be understood that changes may be made in the particular embodiments disclosed which are within the scope of the invention as outlined by the appended claims.

What is claimed is:

1. A camera cleaning apparatus comprising:
a first disc coupled to a first rod,
a camera mounted to a portion of the first disc;
a second disc coupled to a second rod, wherein a first portion of the first rod is situated inside the second rod and the first rod rotates independently of the second rod, wherein the first and the second disc are mounted on an axis of rotation for independent rotation;
a first and a second electronic directional sensor operatively coupled to the first disc, wherein:
the first electronic directional sensor operates to engage a locking mechanism to rotate the first and the second discs in a synchronous direction, and
the second electronic directional sensor operates to disengage the locking mechanism;
a first motor mechanically connected to a first rod, such that the first motor is capable of rotating the first rod;
a second motor mechanically connected to the second rod such that the second rod is capable of rotating the second disc;
a protective cover mounted between the first and the second disc; and
a cleaning mechanism mechanically coupled to the second disc and an attachment point disposed on a portion of the protective cover.

2. The camera cleaning apparatus of claim 1, wherein the second motor is mechanically connected to the second rod via a third shaft coupled to one or more interlocking gears that are coupled to the second shaft.

3. The camera cleaning apparatus of claim 1, further comprising:
a third and a fourth electronic directional sensor operatively coupled to the second disc.

4. The camera cleaning apparatus of claim 3, wherein the first and the fourth electronic directional sensor engage to trigger a locking mechanism to rotate the first and the second discs in a synchronous direction.

5. The camera cleaning apparatus of claim 3, wherein the first and the fourth electronic directional sensor interact to cause completion of an electric circuit that shuts off power to the second motor.

6. The camera cleaning apparatus of claim 3, wherein the second and third electronic directional sensor interact to disengage the locking mechanism that allows the first and the second disc to turn independently of one another.

7. The camera cleaning apparatus of claim 5, wherein the second and third directional sensor interact to cause a disruption of the electric circuit that, when completed, shuts off power to the second motor.

8. The camera cleaning apparatus of claim 1, wherein the first and second disc are coaxially mounted on the axis of rotation.

9. The camera cleaning apparatus of claim 1, wherein the first and the second disc rotate in parallel planes.

10. The camera cleaning apparatus of claim 1, wherein the protective cover is a transparent dome.

11. The camera cleaning apparatus of claim 1, wherein the cleaning mechanism is a wiper blade.

12. A camera cleaning apparatus comprising:
a first disc coupled to a first rod;
a camera mounted to a portion of the first disc;
a first motor mechanically connected to a first rod, such that the first motor is capable of rotating the first rod;
a second disc coupled to a second rod, wherein a first portion of the first rod is situated inside the second rod and the first rod rotates independently of the second rod, wherein the first and the second disc are mounted on an axis of rotation for independent rotation;
a second motor mechanically connected to the second rod such that the second rod is capable of rotating the second disc, wherein the second motor is mechanically connected to the second rod via a third shaft coupled to one or more interlocking gears that are coupled to the second shaft;
a first and a second electronic directional sensor operatively coupled to the first disc, wherein:
the first electronic directional sensor operates to engage a locking mechanism to rotate the first and the second discs in a synchronous direction,
the second electronic directional sensor operates to disengage the locking mechanism, and
the first and second disc are coaxially mounted on the axis of rotation;
a protective cover mounted between the first and the second disc, wherein the protective cover is a transparent dome; and
a cleaning mechanism mechanically coupled to the second disc and an attachment point disposed on a portion of the protective cover, wherein the cleaning mechanism is a wiper blade.

13. The camera cleaning apparatus of claim 12, further comprising:
a third and a fourth electronic directional sensor operatively coupled to the second disc.

14. The camera cleaning apparatus of claim 13, wherein the first and the fourth electronic directional sensor engage to trigger the locking mechanism to rotate the first and the second discs in a synchronous direction.

15. The camera cleaning apparatus of claim 13, wherein the first and the fourth electronic directional sensor interact to cause completion of an electric circuit that, when completed, shuts off power to the second motor.

16. The camera cleaning apparatus of claim 13, wherein the second and third electronic directional sensor interact to disengage the locking mechanism that allows the first and the second disc to turn independently of one another.

17. The camera cleaning apparatus of claim 16, wherein the second third electronic directional sensor interact to cause a disruption of the electric circuit that, when completed, shuts off power to the second motor.

18. The camera cleaning apparatus of claim 12, wherein the first and the second disc rotate in parallel planes.

19. A camera cleaning apparatus comprising:

a first disc coupled to a first rod, a camera mounted to a portion of the first disc;

a first motor mechanically connected to a first rod, such that the first motor is capable of rotating the first rod;

a second disc coupled to a second rod, wherein a first portion of the first rod is situated inside the second rod and the first rod rotates independently of the second rod, wherein the first and the second disc are mounted on an axis of rotation for independent rotation;

a second motor mechanically connected to the second rod such that the second rod is capable of rotating the second disc, wherein the second motor is mechanically connected to the second rod via a third shaft coupled to one or more interlocking gears that are coupled to the second shaft;

a first and a second electronic directional sensor operatively coupled to the first disc, and a third and fourth electronic directional sensor operatively coupled to the second disc, wherein:

the first and the fourth electronic directional sensor engage to trigger a locking mechanism to rotate the first and the second discs in a synchronous direction, and first and the fourth electronic directional sensor interact to cause completion of an electric circuit that shuts off power to the second motor, the second and third electronic directional sensor interact to disengage the locking mechanism that allows the first and the second disc to turn independently of one another, the second and third electronic directional sensor interact to cause a disruption of the electric circuit that, when completed, shuts off power to the second motor, wherein, the first and the second disc rotate in parallel planes, and the first and second disc are coaxially mounted on the axis of rotation;

a protective cover mounted between the first and the second disc, wherein the protective cover is a transparent dome; and a cleaning mechanism mechanically coupled to the second disc and an attachment point disposed on a portion of the protective cover, wherein, the protective cover is a transparent dome, and wherein the cleaning mechanism is a wiper blade.

* * * * *